United States Patent [19]
Kishi et al.

[11] Patent Number: 5,583,540
[45] Date of Patent: Dec. 10, 1996

[54] INPUT APPARATUS FOR DIGITIZER TABLET

[75] Inventors: Katsuto Kishi; Chiaki Matsuda; Takashi Tanabe, all of Kawasaki, Japan

[73] Assignee: Fujitsu Limited, Kawasaki, Japan

[21] Appl. No.: 338,203

[22] Filed: Nov. 9, 1994

[30]     Foreign Application Priority Data

May 19, 1994 [JP] Japan ................................ 6-105720

[51] Int. Cl.⁶ .................................................... G09G 5/08
[52] U.S. Cl. .............................. 345/157; 345/178; 178/18
[58] Field of Search .................................... 345/157, 156, 345/173, 174, 178, 175, 176, 179, 184; 178/18, 19; 33/1 M

[56]          References Cited

U.S. PATENT DOCUMENTS

4,301,326  11/1981  Hetzel et al. ............................ 178/18
5,055,831  10/1991  Padula ...................................... 33/1 M
5,153,570  10/1992  Murray ................................... 345/157

*Primary Examiner*—Richard Hjerpe
*Assistant Examiner*—Xiao M. Wu
*Attorney, Agent, or Firm*—Armstrong, Westerman, Hattori, McLeland & Naughton

[57]          ABSTRACT

An input apparatus for a digitizer tablet includes a lens section, an input operation section and an operation mechanism. The lens section has a mark formed at the bottom to indicate the position to be input, and a pickup coil wound around its peripheral portion. The input operation section has input operation switches and holds the lens section in such a way that the lens section is movable up and down with respect to a digitizer table. The operation mechanism includes a slide lever, a hook member, arm sections and a coupling rod. The operation mechanism is provided in the input operation section to move the lens section toward or away from the digitizer table.

10 Claims, 7 Drawing Sheets

INPUT APPARATUS FOR DIGITIZER TABLET

BACKGROUND OF THE INVENTION

1. Field of the Invention

The present invention relates to a digitizer tablet apparatus for input digital coordinate information to a computer system, such as CAD (Computer Aided Design) system, to digitally read graphic information. More particularly, this invention relates to a digitizer tablet apparatus suitable for reading maps or plat maps into a system which prepares drawings to be submitted when one files the registration of a real property, such as a land and a house. More specifically, this invention relates to an improvement of an input apparatus which is used to pick up positional coordinates in such a digitizer tablet apparatus.

2. Description of the Related Art

For example, a system which prepares drawings used in dealing in a real property, such as a land and a house, and for its registration often uses a digitizer tablet apparatus to read a map or an associated plat map as digital data.

In developing maps filed in the Ministry of Justice (e.g., plat maps, authenticated maps, etc. described in the Real Property Registration Act, article 17 in Japan) or drawings, which was drafted in dealing the same zone, on drawing data that are currently prepared by a drafting system, a digitizer tablet apparatus is often used to read data into the system.

Of course a digitizer tablet apparatus is widely used in reading drawings or the like other than those used in dealing in real properties or for their registration.

A digitizer tablet apparatus allows an operator to input positional coordinates in accordance with a drawing to be digitized (hereinafter referred to as "target drawing") on which original data is depicted, i.e., handwritten or printed data on a data sheet. There are several ways of inputting data, which include: inputting a train of continuous dots, inputting only predetermined coordinates and inputting coordinates every given time or every given distance. Popular input systems based on the input principle are an electromagnetic induction system, magnetostrictive system, resistive system and piezoelectric system. For example, the electromagnetic induction system electrically scans many coordinate lines, buried in a matrix form in a digitizer table of a digitizer tablet apparatus, and detects voltages induced on the coordinate lines in responsive to the magnetic flux generated by the exciting coil in the input apparatus that picks up coordinates from a data sheet. This system has a high resolution.

Input devices of any kinds, called free cursors or the like, which determine the input position in such a digitizer tablet apparatus, have substantially the same structure.

Figure 1:
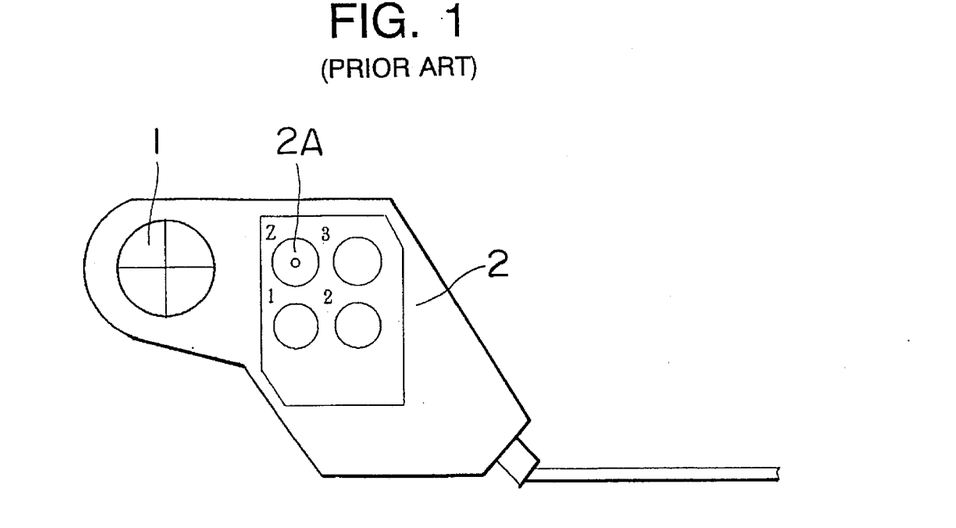
FIG. 1 is a top view exemplifying the structure of an input apparatus for a typical conventional digitizer tablet.
Figure 2:
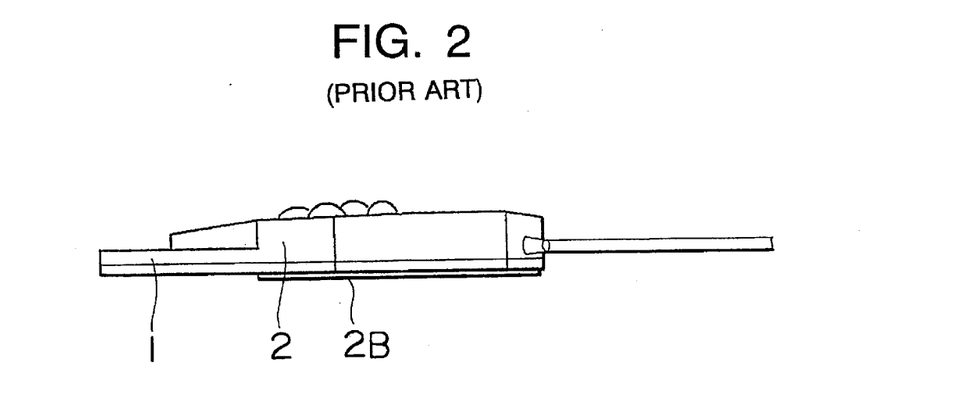
FIG. 2 is a side view showing the structure of the input apparatus for a digitizer tablet shown in FIG. 1.

FIGS. 1 and 2 are a top view and a side view of an input apparatus used in a conventional digitizer tablet apparatus.

The input apparatus has a lens section 1 with a cross cursor for instructing the positional coordinates of a target drawing on a data sheet and an input operation section 2 which normally has a plurality of operation buttons 2A to input data. The lens section 1 is held on a part of the input operation section 2.

The conventional input apparatus shown in FIGS. 1 and 2 is often moved and operated while being nearly in contact to a data sheet on a digitizer table. To improve the operability, a bottom cloth 2B such as felt is adhered to the bottom of the input operation section 2. The lens section 1 with the cross cursor to instruct data points or the positions of measured portions of a zone is normally made of transparent plastics. To prevent the bottom of the lens section 1 from being stained or damaged by the friction in the sliding manipulation, therefore, its bottom is fixed, slightly lifted from the bottom of the input operation section 2.

Figure 3:
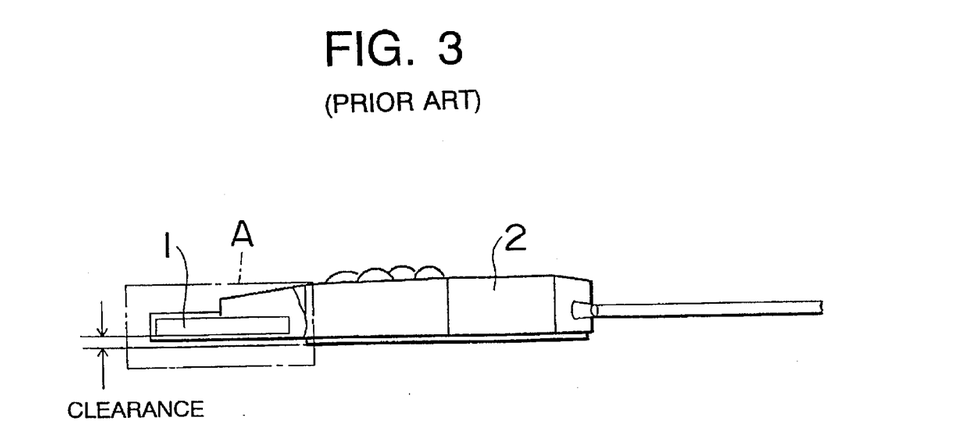
FIG. 3 is a side view for explaining the shortcomings of the input apparatus for a digitizer tablet shown in FIG. 1.
Figure 4:
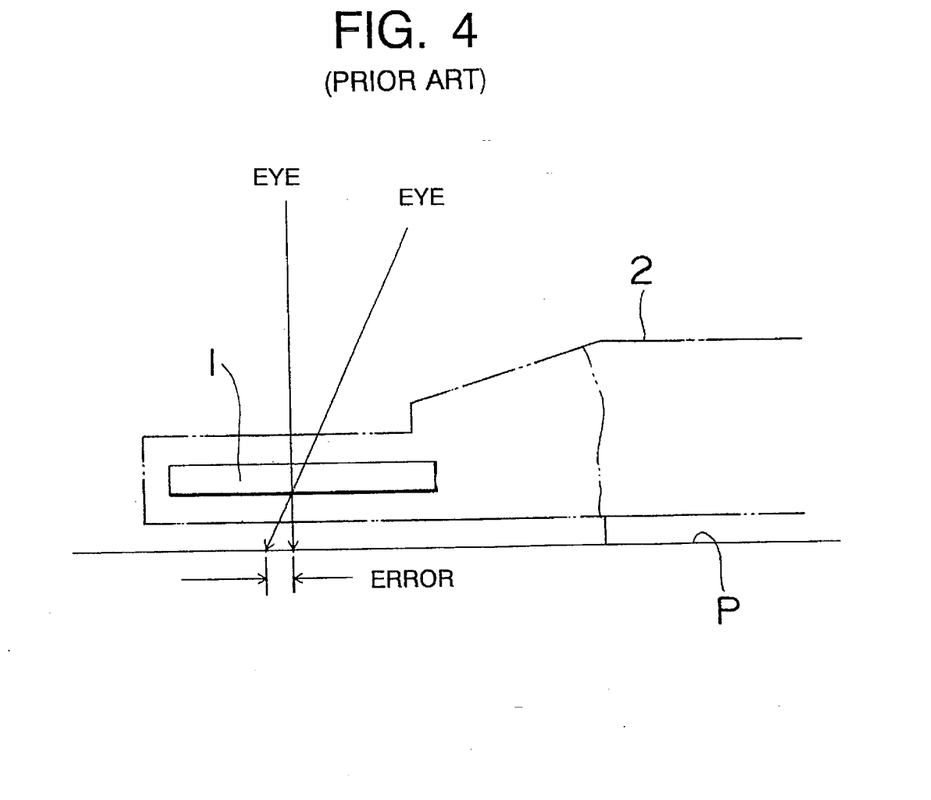
FIG. 4 is a cross-sectional view depicting a portion A in FIG. 3 in detail.

As shown in FIG. 3, the bottom of the lens section 1 is lifted about 0.2 to 0.3 mm or more above a data sheet P as an input original. This distance or clearance causes a positional error between an intended input data point and actual input data, depending on the angle of view of the operator as shown in FIG. 4. This error is not negligible in drawings which demand high precision, such as drawings to be submitted in the registration of a real property.

Let us consider the case where data of a map with a scale ratio of 1:500 is read into a drafting system using a digitizer tablet apparatus. Suppose that an error of about 1 mm on the data sheet has occurred at the time data was input. This error is a deviation of about 500 mm or 50 cm in real scale. If a drawing to be submitted in the registration of a real property contains such a positional error, there is an inevitable error in the zone area, which significantly affect the interest of the applicant alone or the interests of the applicant and the neighbors. This type of a problem is likely to go into a lawsuit in an extreme case, and there are actually such lawsuits.

As described above, data error may occur due to the eye measurement, making the topography on a drawing to be submitted different from the actual topography. Such a difference in the area of a land is likely to cause a conflict between the persons concerned in this matter and to lead to a conflict over the money. In this respect, it is important to improve the input precision in the input apparatus.

SUMMARY OF THE INVENTION

Accordingly, it is an object of the present invention to provide an input apparatus for a digitizer tablet, which has a relatively simple structure to easily input positional coordinates with high accuracy.

To achieve the above object, according to one aspect of this invention, there is provided an input apparatus for a digitizer tablet, which comprises:

a lens section having a mark for indicating a position to be input;

an input operation section with input operation switches, for holding the lens section in such a way that the lens section is movable up and down with respect to the surface of a digitizer table; and an operation mechanism, provided in the input operation section, for moving the lens section toward or away from the surface of the digitizer table.

In the input apparatus, the operation mechanism may include a slide section to be slid by an operator and a driving section for driving the lens section between a state where the bottom of the lens section is level with the bottom of the input operation section and a state where the bottom of the lens section is lifted from the bottom of the input operation section, in responsive to a movement of the slide section. Alternatively, the operation mechanism in the input apparatus may include a spring for urging the lens section away from the surface of the digitizer table, a depression section operable together with the lens section and to be depressed by the operator against force of the spring, an engagement section for stopping or latching the depression section with a bottom of the lens section being level with a bottom of the input operation section, and a release section for disengaging the engagement section.

Further, the mark of the lens section may be a cross cursor, or a cross cursor with a circular portion in the center. The lens section may have a mark provided at the bottom and a pickup coil wound around the peripheral portion.

According to a second aspect of this invention, there is provided an input apparatus for a digitizer tablet, which comprises:

- a lens section having a mark provided at a bottom for indicating a position to be input and a pickup coil wound around a peripheral portion;
- an input operation section having input operation switches; and
- a flexible cable for electrically coupling the lens section to the input operation section.

The mark of the lens section may be a cross cursor or a cross cursor with a circular portion in the center.

According to a third aspect of this invention, there is provided a digitizer tablet apparatus comprising:

- a digitizer table on which a data sheet with described data to be input is placed and which generates positional information when electrically coupled to an input apparatus; and
- the input apparatus including a lens section having a mark formed at the bottom for indicating a position to be input and a pickup coil wound around its peripheral portion, an input operation section with input operation switches, for holding the lens section in such a way that the lens section is movable up and down with respect to the surface of the digitizer table, and an operation mechanism section, provided in the input operation section, for moving the lens section toward or away from the surface of the digitizer table.

According to a fourth aspect of this invention, there is provided a digitizer tablet apparatus comprising:

- a digitizer table on which a data sheet with described data to be input is placed and which generates positional information when electrically coupled to an input apparatus; and
- the input apparatus including a lens section having a mark formed at a bottom for indicating a position to be input and a pickup coil wound around a peripheral portion, an input operation section with input operation switches and a flexible cable for electrically connecting the lens section to the input operation section.

According to the input apparatus for a digitizer tablet, which embodies the present invention, the lens section is movable and the pickup coil is wound around the lens section, whereby an operator uses the lens section in close contact with a data sheet. This structure can ensure accurate inputting of data to draft errorless drawings to be submitted. In this case, as the lens section can be lifted above the data sheet, the data sheet can be prevented from being stained or damaged by the friction of the lens section.

The most critical problem of the conventional input apparatus is that due to the clearance between a data sheet and the input apparatus, the position of data to be input may deviate from the actual position depending on the position of the eyes of an operator observing the diagram at the time of data input. According to the input apparatus embodying the present invention, however, the lens section of the input apparatus is set in close contact with a data sheet to eliminate such an input error. Since it is unnecessary to always set the lens section in close contact with the data sheet, the lens section is set apart from the data sheet while moving. To eliminate an input error, the lens section and the coil are designed integral with each other.

Particularly, it is possible to effectively prevent the deterioration of the lens in the case where the input apparatus is designed to be able to move only the lens section including the coil and the lens section is coupled to the input operation section by a flexible cable.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Input apparatuses for a digitizer tablet according to specific embodiments of the present invention will be described below with reference to the accompanying drawings.

First Embodiment

Figure 5:
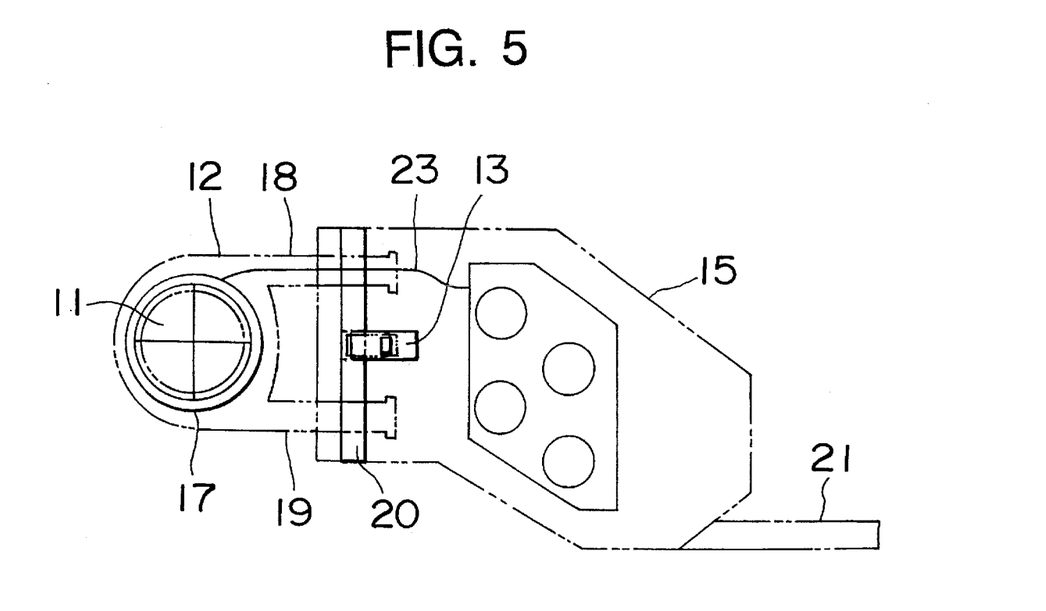
FIG. 5 is a top view showing the structure of an input apparatus for a digitizer tablet according to a first embodiment of the present invention.
Figure 6:
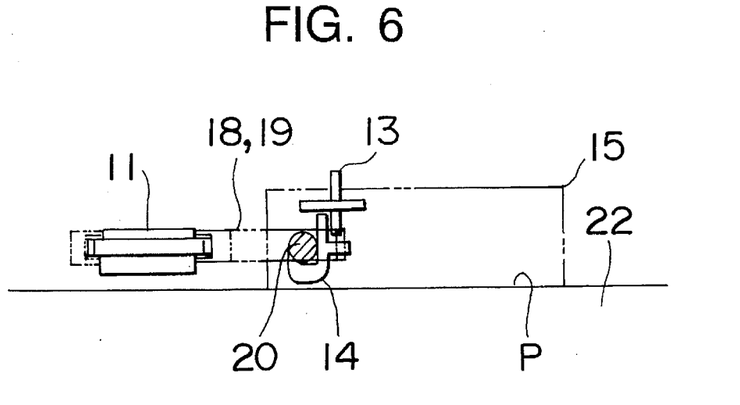
FIG. 6 is a cross-sectional view showing the structures of the essential portions of the input apparatus for a digitizer tablet in FIG. 5.

FIGS. 5 and 6 are a top view and a side view which show the structure of an input apparatus for a digitizer tablet according to the first embodiment of the present invention.

The input apparatus for a digitizer tablet shown in FIGS. 5 and 6 includes a lens section 11, a lens holding section 12, a slide lever 13, a hook member 14 and an input operation section 15.

The lens section 11 has a nearly disk shape and is made of, for example, transparent plastics. The lens section 11 has a cross cursor 16 formed at the bottom. A pickup coil 17 is wound around the peripheral portion of the lens section 11.

The lens holding section 12 holds the lens section 11. The lens holding section 12 has two arm sections 18 and 19, extending in parallel from the lens section 11 in the direction of the tangent line, and a coupling rod 20 penetrating through the end portions of the arm sections 18 and 19 and secured there.

The input operation section 15 has a slide guide (not shown) which is fitted in the lens holding section 12 at the distal ends of the arm sections 18 and 19, and holds the lens holding section 12 in such a manner that this section 12 is movable up and down along the slide guide. Though not clearly illustrated, the input operation section 15, like the one in the prior art, has four operation buttons on the top, which are constituted of depression type switches to input data, an internal circuit for performing processes according to the depression of the operation buttons, and a cloth like felt attached to the bottom. The circuit for the operation buttons is connected to the coil 17 via flexible lead wires 23, and is connected to a digitizer table 22 via a connection cord 21 that is led out from the input operation section 15.

The slide lever 13 is provided inside the input operation section 15 in the vicinity of the top surface in such a way as to be slidable in the direction to come close to and away from the lens section 11. The slide lever 13 has projections formed on the top and bottom of a plate-like member. The upper projection protrudes outside from a window formed in the top surface of the input operation section 15. The lower projection is engaged with the hook member 14 to rotate the hook member 14.

The hook member 14 is provided inside the input operation section 15 and under the slide lever 13 and is engaged with the lower projection and the coupling rod 20. As the slide lever 13 moves closer to and away from the lens section 11, the hook member 14 rotates nearly 90 degrees around the coupling rod 20. As shown in FIG. 6, the hook member 14 is designed to have an engagement projection provided at the straight portion of a nearly J-shaped portion in cross section. FIG. 6 shows the slide lever 13 manipulated to come away from the lens section 11 and the hook member 14 positioned at the rotational limit in the clockwise direction in the diagram. Under this situation, the coupling rod 20 is pushed upward in the diagram by the hook member 14, and the lens section 11 and lens holding section 12 are moved upward together. Further, the lens section 11 is lifted with its bottom located above the bottom of the input operation section 15.

Figure 7:
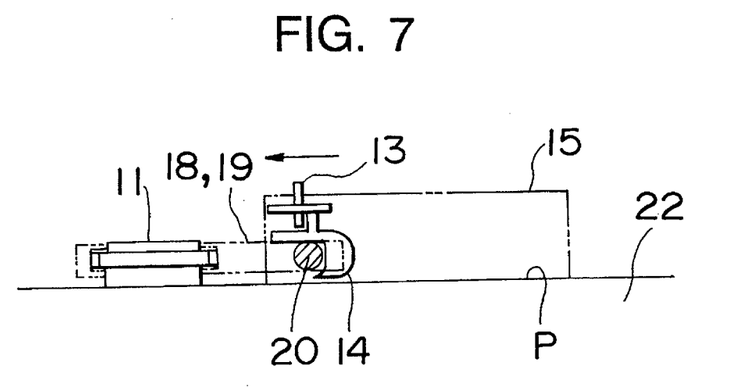
FIG. 7 is a cross-sectional view for explaining the operations of the essential portions of the input apparatus for a digitizer tablet in FIG. 5.

When the slide lever 13 is manipulated to approach the lens section 11 from the above state, the hook member 14 engaged with the lower projection of the slide lever 13 rotates nearly 90 degrees counterclockwise in FIG. 6 to be positioned as shown in FIG. 7 where the hook member 14 has reached the rotational limit in the counterclockwise direction. Under this situation, the coupling rod 20 is pushed downward in the diagram by the hook member 14, and the lens section 11 and lens holding section 12 are moved down together, with the bottom of the lens section 11 positioned substantially level with the bottom of the input operation section 15.

When the slide lever 13 is manipulated again to move away from the lens section 11, the hook member 14 rotates clockwise in the diagram to lift up the coupling rod 20 in the diagram back to the state shown in FIG. 6. The lens section 11 and lens holding section 12 are moved upward together so that the lens section 11 stays lifted.

As described above, the hook member 14 functions like some kind of a cam to move the lens holding section 12 when rotated. The slide lever 13 constitutes a slide section, and the hook member 14 and the coupling rod 20 constitute a driving section. Further, the slide lever 13, the hook member 14, the arm sections 18 and 19 and the coupling rod 20 constitute an operation mechanism.

A description will now be given of an operation to draft a drawing to be submitted in the registration of a real property using the thus constituted input apparatus for a digitizer tablet.

Figure 8:
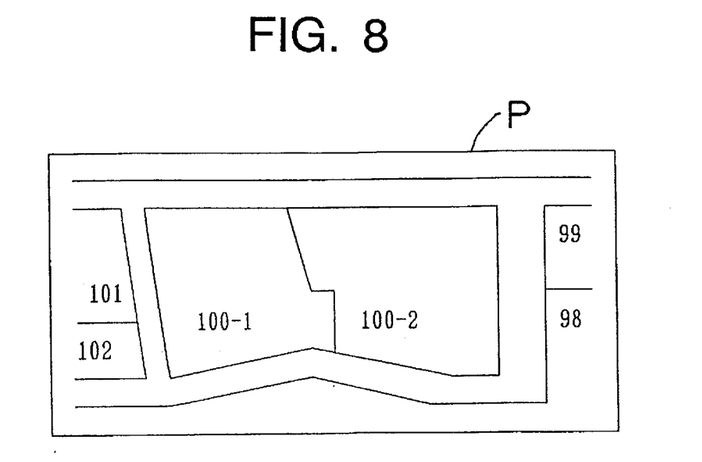
FIG. 8 is a diagram showing one example of target drawing data to be scanned by a digitizer tablet apparatus.

A data sheet P on which to-be-scanned map data as shown in FIG. 8 is placed on the digitizer table 22 of the digitizer tablet apparatus securely as needed. Graphical information constituting the map data is read from the data sheet P using the above-described input apparatus. To move the input apparatus to the position where the cross cursor 16 of the lens section 11 close to the intended or target read point in reading the information, the operator operates the slide lever 13 of the input apparatus in the direction away from the lens section 11 to lift the lens section 11 above the data sheet P on the digitizer table 22.

Figure 9:
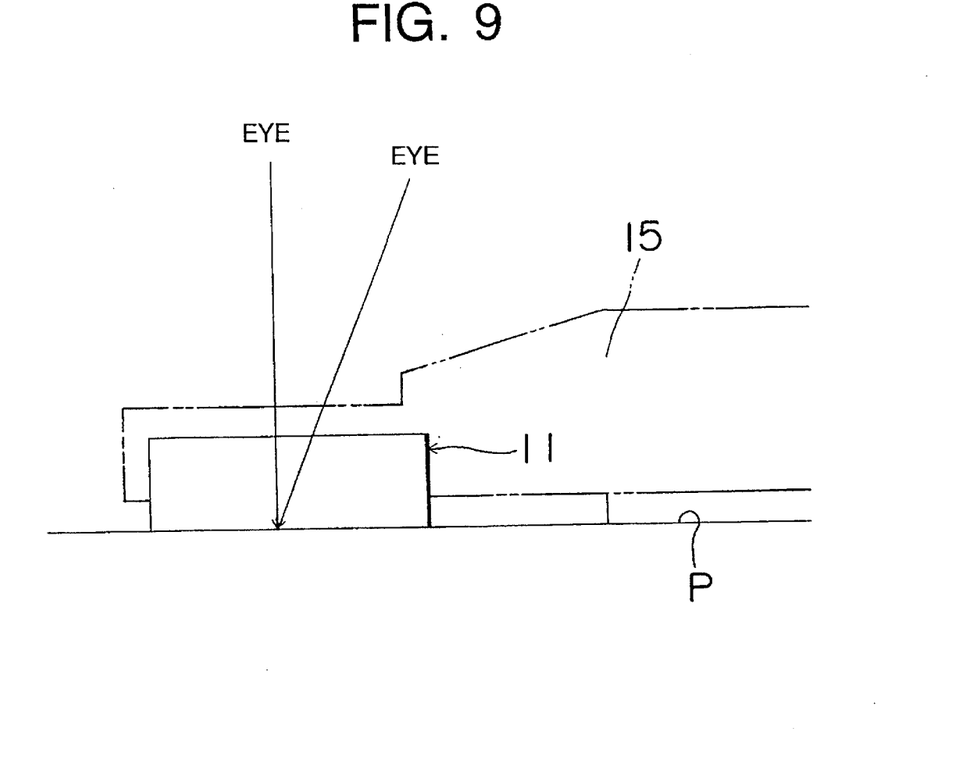
FIG. 9 is a cross-sectional view showing in detail the essential portions of the input apparatus for a digitizer tablet in FIG. 5 for explaining the action of the input apparatus.

With the cross cursor 16 of the lens section 11 located near the target read point, the operator manipulates the slide lever 13 toward the lens section 11 to move down the lens section 11 so that the lens section 11 comes in close contact with the data sheet P on the digitizer table 22. At this time, the cross cursor 16, formed at the bottom of the lens section 11, closely contacts the data sheet P and the coil 17 is wound around the peripheral portion of the lens section 11, thus causing no reading error originating from the view direction in the eye measurement as apparent from FIG. 9. When the cross cursor 16 is positioned to the target read point and the operation buttons of the input operation section 15 are operated properly under this situation, data at the read point is input. The operation buttons should be selectively used as needed in accordance with the types of the input operations, such as inputting data at a new point, reading data at a point closest to the existing point, reading data at a point on the line which has already been scanned, canceling of the input point and termination of data input at the read point. In general, the functions of the operation buttons are properly set in accordance with an application program for drafting and editing drawings.

After data reading, the operator manipulates the slide lever 13 of the input apparatus to move it away from the lens section 11 so that the lens section 11 is lifted above the data sheet P on the digitizer table 22. The operator further moves the input apparatus to the position where the cross cursor 16 of the lens section 11 comes close to the next target read point.

Figure 10:
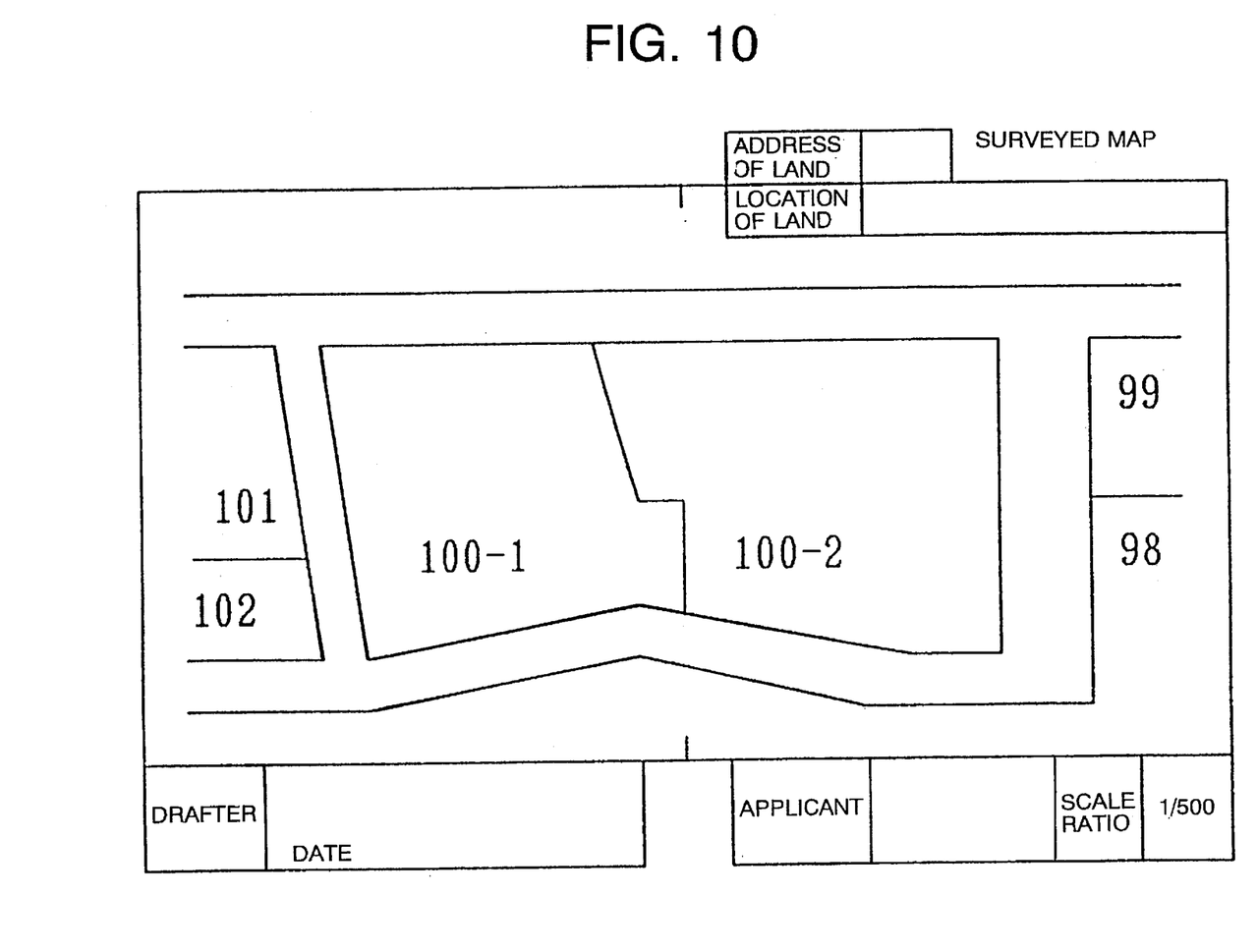
FIG. 10 is a diagram showing one example of a drawing which has been drafted by reading the data in FIG. 8 with the digitizer tablet apparatus and which will be submitted for the registration of a real property.

After all the required positional coordinates are input in the above manner, the operator performs the necessary processing, such as additional drafting and edition, to prepare a diagram for the registration of a real property as shown in FIG. 10.

According to the above-described digitizer tablet apparatus, the lens section 11 is set in close contact with the data sheet P on the digitizer table 22 only in the vicinity of a target read point to ensure accurate data reading. During movement between individual read points, the lens section 11 is lifted above the data sheet P, so that the lens section 11 can be prevented from being stained or damaged. This can also prevent the data sheet P from being stained or damaged.

To ensure the up and down manipulation of the lens section 11, a spring may be provided to normally urge the lens holding section 12 upward or downward. To permit the lens holding section 12 to move in parallel, not tilted, to the input operation section 15, a proper guide mechanism or a tilt preventing mechanism may be provided additionally. Further, a cam mechanism having the same function as the hook member 14 may be provided in place of the hook member 14.

According to the above-discussed input apparatus for a digitizer tablet, the lens section is movable up and down and the pickup coil is integrally wound around the lens section. At the time of reading data, the operator sets the lens section in close contact with a data sheet to accurately input data, so that an errorless drawing or the like to be submitted can be drafted. Since the lens section can be lifted above the data sheet at the time the input apparatus is moved, the lens section and the data sheet can be prevented from being stained or damaged by the friction therebetween.

Second Embodiment

Figure 11:
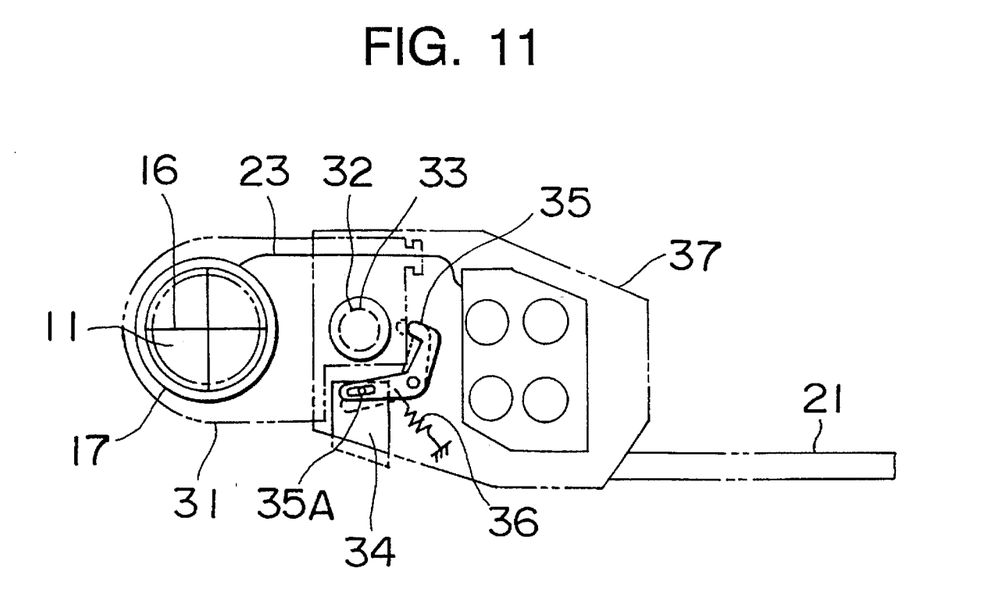
FIG. 11 is a top view showing the structure of an input apparatus for a digitizer tablet according to a second embodiment of this invention.
Figure 12:
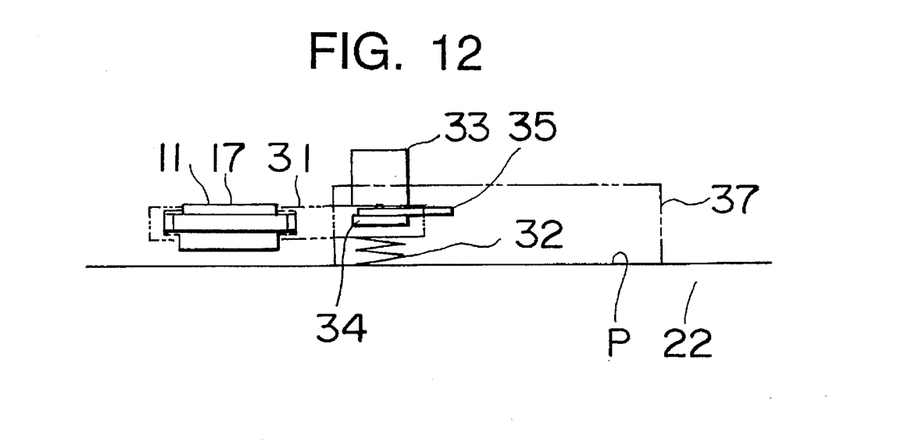
FIG. 12 is a cross-sectional view showing the structures of the essential portions of the input apparatus for a digitizer tablet in FIG. 11.

FIGS. 11 and 12 are a top view and a side view which show the structure of an input apparatus for a digitizer tablet according to the second embodiment of the present invention.

The input apparatus for a digitizer tablet shown in FIGS. 11 and 12 includes a lens section 11, a lens holding section 31, a lifting spring 32, a lift-down button 33, a lift-up button 34, an engagement member 35, an engagement spring 36 and an input operation section 37. The lens section 11 is substantially the same as the one shown in FIGS. 5 and 6.

The lens holding section 31 holds the lens section 11. The lens holding section 31 has the shape of a plate having two ends. The lens section 11 is fitted in one end portion of the lens holding section 31 and the lift-down button 33 with a nearly columnar shape protrudes upward from the other end portion.

The input operation section 37 allows the lens holding section 31 to be fitted in the slide guide at the end where the lift-down button 33 is protrusively provided, and holds the lens holding section 31 in such a way that this section 31 can make a parallel movement in the up and down directions. The lift-down button 33 has its head portion protruding above the top surface of the input operation section 37 through an opening formed in the input operation section 37. Though not clearly illustrated, the input operation section 37, like the one in the prior art, has four operation buttons on the top, which are constituted of depression type switches to input data, an internal circuit for performing processes according to the depression of the operation buttons, and a cloth like felt attached to the bottom. The circuit for the operation buttons is connected to a coil 17 via flexible lead wires 23, and is connected to a digitizer table 22 via a connection cord 21 that is led out from the input operation section 37. The lens holding section 31 is normally urged above the input operation section 37 by the lifting spring 32 provided inside and at a lower portion of the input operation section 37.

The lift-up button 34 has its distal end portion protruding from one side of the input operation section 37 to be retractable in and protractible from the input operation section 37 along the protruding direction. The lift-up button 34 is engaged with the engagement member 35 at its proximal end. The engagement member 35 has approximately an "L" shape as illustrated, and is supported in the input operation section 37 to be rotatable at the bending part of the L shape. The engagement spring 36 normally applies counterclockwise rotational force in FIG. 11 to the engagement member 35. A pin 35A protrudes from one rotational end portion of the engagement member 35 and is engaged with an elongated hole formed in the proximal end of the lift-up button 34 to normally push the lift-up button 34 in the protruding direction. Formed on the other rotational end portion of the engagement member 35 is a projection protruding in the counterclockwise direction (circumferential direction) in the diagram. This projection has such a size and shape as to ensure engagement with the lens holding section 31.

FIG. 12 shows the lens section 11 lifted above a data sheet P in which state the engagement member 35 is not engaged with the lens holding section 31 and the lens section 11 and the lens holding section 31 are urged upward by the force of the lifting spring 32. Under this situation, the lift-down button 33 is protruding upward most, while the lift-up button 34 has a minimum amount of projection (i.e., it is retracted most).

Figure 13:
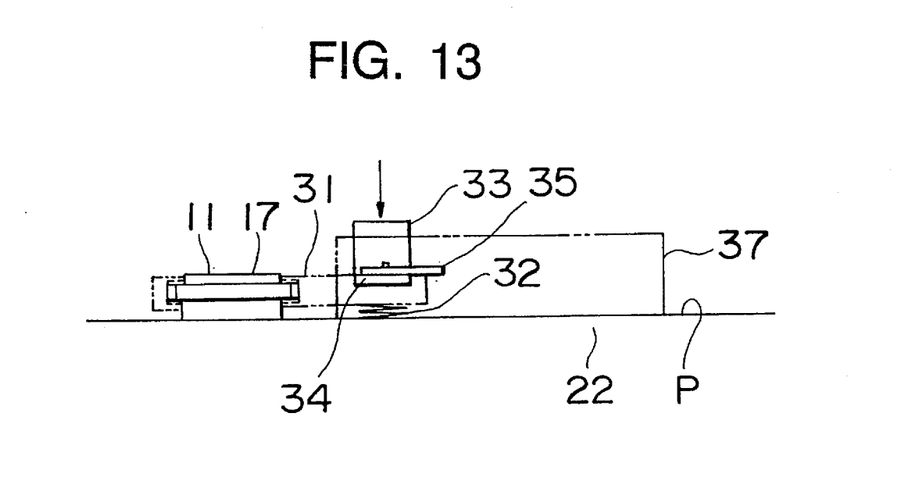
FIG. 13 is a cross-sectional view for explaining the operations of the essential portions of the input apparatus for a digitizer tablet in FIG. 11.

When the lift-down button 33 is depressed downward in this condition, the lens section 11 and the lens holding section 31 move downward against the force of the lifting spring 32. When the bottom of the lens section 11 comes substantially level with the bottom of the input operation section 37 as shown in FIG. 13, the projection formed on the other rotational end portion of the engagement member 35, which is given the rotational force by the engagement spring 36, engages with the lens holding section 31 to stop the lens section 11 and the lens holding section 31. At this time, the engagement member 35 is rotated counterclockwise in FIG. 11 and the amount of projection of the lift-up button 34 becomes maximum (the button 34 protrudes most).

When the lift-up button 34 is depressed in this situation, the engagement member 35 rotates clockwise in FIG. 11 against the force of the engagement spring 36 to disengage the projection formed at the other rotational end portion from the lens holding section 31. The disengagement of the engagement member 35 causes the lens section 11 and the lens holding section 31 to move upward against the force of the lifting spring 32 and return to the states shown in FIG. 12.

The lift-down button 33 constitutes a depression section, the engagement member 35 constitutes an engagement section and the lift-up button 34 constitutes a disengaging section. Therefore, those lifting spring 32, lift-down button 33, lift-up button 34, engagement member 35 and engagement spring 36 constitute the operation mechanism in this example.

To move the thus constituted input apparatus for a digitizer tablet to the position where the cross cursor 16 of the lens section 11 close to the target read point, an operator depresses the lift-up button 34 to lift the lens section 11 above the data sheet P on the digitizer table 22 as shown in FIG. 12.

With the cross cursor 16 of the lens section 11 located near the target read point, the operator depresses the lift-down button 33 downward to descend the lens section 11 and the lens holding section 31 is stopped at the lower position by the engagement member 35 to set the lens section 11 in close contact with the data sheet P on the digitizer table 22 as shown in FIG. 13. When the cross cursor 16 is positioned to the target read point under this situation and the operation buttons of the input operation section 37 are properly operated, data at the read point is input.

After data reading, the operator depresses the lift-up button 34 to disengage the lens holding section 31 with the engagement member 35, lifting the lens section 11 above the data sheet P on the digitizer table 22. The operator then moves the input apparatus for a digitizer tablet to the position where the cross cursor 16 of the lens section 11 comes close to the next target read point.

As the desired positional coordinates are input in this manner, the lens section 11 is set in close contact with the data sheet P on the digitizer table 22 only in the vicinity of a target read point to ensure accurate data reading. During movement between individual read points, the lens section 11 is lifted above the data sheet P, so that the lens section 11 and the data sheet P can be prevented from being stained or damaged.

Third Embodiment

Figure 14:
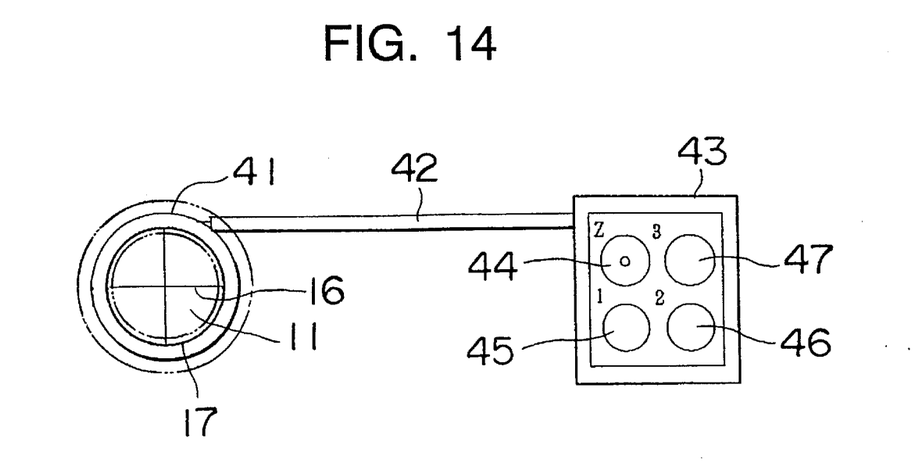
FIG. 14 is a top view showing the structure of an input apparatus for a digitizer tablet according to a third embodiment of this invention.
Figure 15:
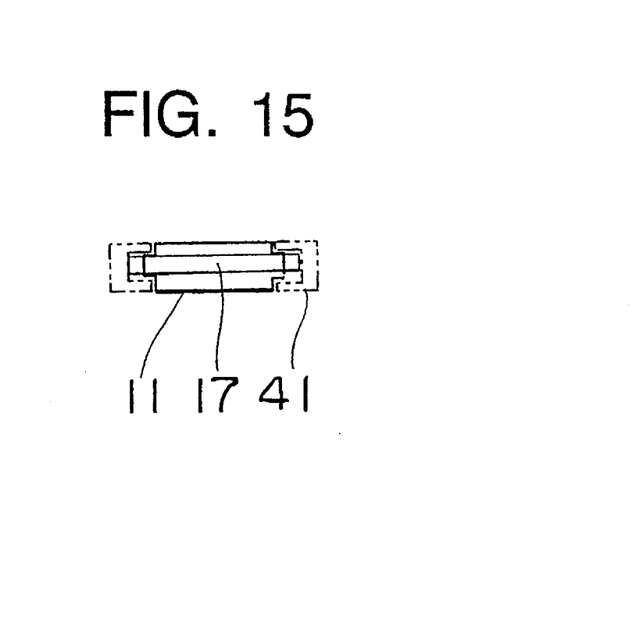
FIG. 15 is a cross-sectional view showing the structure of the lens section of the input apparatus for a digitizer tablet in FIG. 14.

FIGS. 14 and 15 are a top view and a side view which show the structure of an input apparatus for a digitizer tablet according to the third embodiment of the present invention.

The input apparatus for a digitizer tablet shown in FIGS. 14 and 15 includes a lens section 11, a lens protection section 41, a flexible cable 42 and an input operation section 43. The lens section 11 is substantially the same as those shown in FIGS. 5, 6, 11 and 12, and a coil 17 is likewise the same as the illustrated one.

The lens protection section 41 is a frame member for protecting the lens section 11. The lens section 11 and the lens protection section 41 are constituted integrally, so that an operator can manipulate the lens protection section 41 as desired while holding it.

The input operation section 43 has four operation buttons 44, 45, 46 and 47 constituted of depression type switches to input data, and incorporates a circuit, though not illustrated, for performing processes according to the depression of the operation buttons. When in use, the input operation section is secured to a proper position on a digitizer table at least temporarily to facilitate the manipulation of the operation buttons 44–47. The circuit for the operation buttons is connected to the coil 17 of the lens section 11 via the flexible cable 42, and is also connected to the digitizer table via a connection cord that is led out from the input operation section 43.

In the case where the thus constituted input apparatus for a digitizer tablet is used, the operator moves the lens section 11 close to a target read point by holding the lens protection section 41. Accordingly, the lens section 11 can be moved off a data sheet on the digitizer table.

After the lens protection section 41 is moved together with the lens section 11 close to the target read point, the operator sets the lens section 11 in close contact with the data sheet on the digitizer table to position the cross cursor 16 on the target read point. The operator then properly manipulates the operation buttons 44–47 of the input operation section 43 to input data at the read point.

In this case, the input operation section 43 may be temporarily held at a position close to the input position on the digitizer table by an unillustrated proper holding mechanism before the manipulation of the lens section 11. Alternatively, the input operation section 43 may be normally secured to a predetermined position on the digitizer table at which the input operation section 43 is easy to operate.

After data reading, the operator holds the lens protection section 41 and moves the lens section 11 off the data sheet P to a point close to the next read point.

As the desired positional coordinates are input in this manner, the lens section 11 is set in close contact with the data sheet P on the digitizer table 22 only in the vicinity of a target read point to ensure accurate data reading. During movement between individual read points, the lens section 11 is lifted off the data sheet P, so that the lens section 11 and the data sheet P can be prevented from being stained or damaged.

Figure 16:
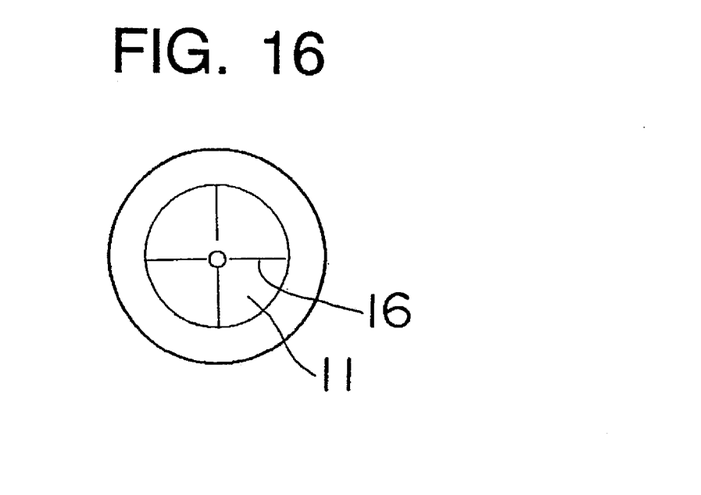
FIG. 16 is a diagram showing the shape of another cursor formed on the lens section of the input apparatus for a digitizer tablet according to this invention.

It is preferable that the positioning cursor provided on the lens section 11 in the input apparatus of each embodiment discussed above should be the aforementioned cross cursor 16 from the viewpoint of precision. To facilitate the operation, however, a cross cursor having a small circle or a small circular portion formed in the center portion as shown in FIG. 16. It is desirable that this small circular portion have a diameter of 1 mm or smaller from the viewpoint of input precision. Any of the mentioned cursors may be directly drawn, printed or inscribed on the bottom of the lens section 11. Further, a protection film which covers the bottom of the lens section 11 may be formed on the surface of the cursor.

It is apparent that, in this invention, a wide range of different working modes can be formed based on the invention without deviating from the spirit and scope of the invention.

What is claimed is:

1. An input apparatus for a digitizer tablet, which comprises:

a lens section having a mark for indicating a position to be input;

an input operation section with input operation switches, for holding said lens section in such a way that said lens section is movable up and down with respect to a surface of a digitizer table while maintaining a bottom surface of said lens section substantially parallel to said surface of said digitizer table; and an operation mechanism, provided in said input operation section, for moving said lens section toward or away from said surface of said digitizer table.

2. The apparatus according to claim 1, wherein said operation mechanism includes a slide section to be slid by an operator and a driving section for driving said lens section between a state where said bottom surface of said lens section is level with a bottom of said input operation section and a state where said bottom surface of said lens section is lifted above said bottom of said input operation section, in response to a movement of said slide section.

3. The apparatus according to claim 1, wherein said operation mechanism includes a spring for urging said lens section away from said surface of said digitizer table, a depression section operable together with said lens section and to be depressed by said operator against force of said spring, an engagement section for stopping said depression section with a bottom of said lens section being level with a bottom of said input operation section, and a release section for disengaging said engagement section.

4. The apparatus according to any one of claims 1 to 3, wherein said mark of said lens section is a cross cursor.

5. The apparatus according to any one of claims 1 to 3, wherein said mark of said lens section is a cross cursor with a circular portion in a center.

6. An input apparatus for a digitizer tablet, comprising:

a lens section having a mark provided at a bottom for indicating a position to be input and a pickup coil wound around a peripheral portion;

an input operation section having input operation switches;

an operation mechanism for moving said lens section toward or away from a surface of a digitizer table in a direction substantially perpendicular to said digitizer table; and a flexible cable for electrically coupling said lens section to said input operation section.

7. The apparatus according to claim 6, wherein said mark of said lens section is a cross cursor.

8. The apparatus according to claim 6, wherein said mark of said lens section is a cross cursor with a circular portion in a center.

9. A digitizer tablet apparatus comprising:

a digitizer table on which a data sheet with described data to be input is placed and which generates positional information when electrically coupled to an input apparatus; and said input apparatus including a lens section having a mark formed at a bottom for indicating a position to be input and a pickup coil wound around a peripheral portion, an input operation section with input operation switches, for holding said lens section in such a way that said lens section is movable up and down with respect to a surface of said digitizer table while maintaining a bottom surface of said lens section substantially parallel to said surface of said digitizer table, and an operation mechanism section, provided in said input operation section, for moving said lens section toward or away from said surface of said digitizer table.

10. A digitizer tablet apparatus comprising:

a digitizer table on which a data sheet with described data to be input is placed and which generates positional information when electrically coupled to an input apparatus; and said input apparatus including a lens section having a mark formed at a bottom for indicating a position to be input and a pickup coil wound around a peripheral portion, an input operation section with input operation switches, a flexible cable for electrically connecting said lens section to said input operation section and an operation mechanism for moving said lens section toward or away from a surface of a digitizer table in a direction substantially perpendicular to said digitizer table.

* * * * *